Jan. 8, 1924.
J. HARRIS
1,479,989
MACHINE FOR CUTTING AND WELDING WITH FLUID FUEL
Filed April 29, 1920    2 Sheets-Sheet 1
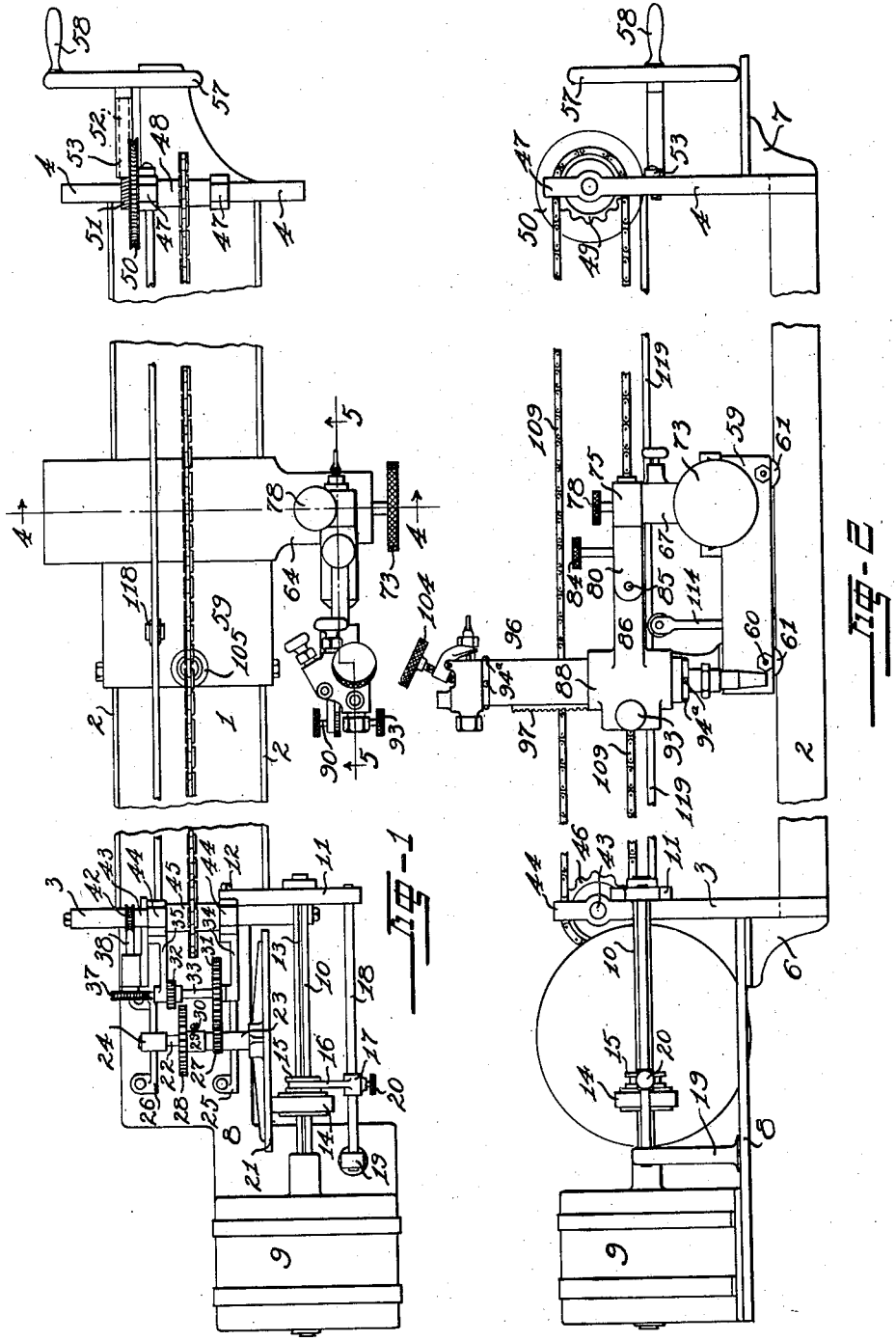

Jan. 8, 1924.
J. HARRIS
1,479,989
MACHINE FOR CUTTING AND WELDING WITH FLUID FUEL
Filed April 29, 1920   2 Sheets-Sheet 2
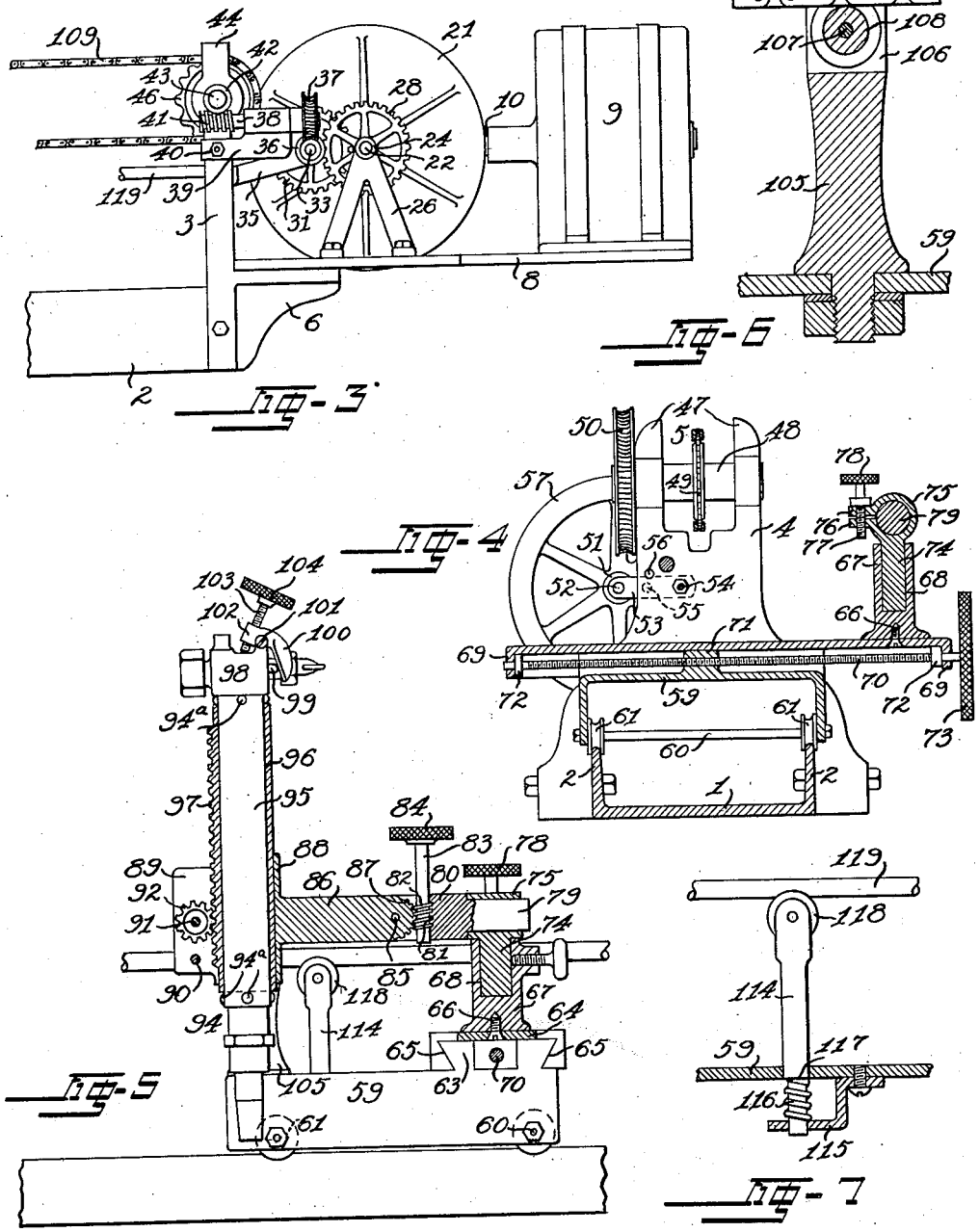

Patented Jan. 8, 1924.

1,479,989

UNITED STATES PATENT OFFICE.

JOHN HARRIS, OF LAKEWOOD, OHIO, ASSIGNOR TO CARBO-OXYGEN COMPANY, OF PITTSBURGH, PENNSYLVANIA, A CORPORATION OF DELAWARE.

MACHINE FOR CUTTING AND WELDING WITH FLUID FUEL.

Application filed April 29, 1920. Serial No. 377,500.

*To all whom it may concern:*

Be it known that I, JOHN HARRIS, a citizen of the United States, residing at Lakewood, in the county of Cuyahoga and State of Ohio, have invented a certain new and useful Improvement in Machines for Cutting and Welding with Fluid Fuel, of which the following is a full, clear, and exact description, reference being had to the accompanying drawings.

This invention relates to machines of the type that are employed for cutting and welding with gases. One of the objects of the invention is to provide a machine of this character with means whereby the speed at which the torch carriage is moved may be conveniently and efficiently controlled and varied; to provide a machine of this character with means whereby the torch may be conveniently re-set when it has reached the end of its travel in one direction; to provide for machines of this character a novel and efficient means for moving the torch; to provide for a machine of this character means whereby the torch may be driven either by power or manually; also so to mount the torch, as to enable the same to be conveniently adjusted with reference to the work in order to operate in the most effective manner thereupon. Further and more limited objects of the invention will appear hereinafter in the specification and will be realized in and through the combinations of elements included in the claims attached to and forming a part hereof.

In the drawings, illustrating one embodiment of my invention, Fig. 1 represents a plan view of a machine of the character set forth; Fig. 2 a side elevation of said machine; Fig. 3 a detail in elevation of the left hand or motor-operating end of the machine shown in Fig. 1; Fig. 4 a sectional view corresponding to the lines 4—4 of Fig. 1, certain parts being shown in elevation; Fig. 5 a sectional view corresponding to the line 5—5 of Fig. 1, certain parts being shown in elevation; Fig. 6 a sectional detail taken through the means for clamping the torch carriage to the driving chain; and Fig. 7 a sectional elevation of the means for holding the torch carriage on its rails.

Describing the parts by reference characters, 1 denotes a base plate having channeled flanges 2 constituting rails. Projecting upwardly from each end of the plate 1 is a vertical frame or standard, indicated at 3 and 4. These standards are identical in construction and are each recessed, as indicated at 5, for a purpose to be described hereinafter. Secured to each of the standards 3 and 4 is a bracket, indicated at 6 and 7, respectively, the bracket 6 supporting a table 8 on which is mounted a motor 9. This motor is preferably a constant-speed motor of ample size and power to withstand all ordinary usage. The shaft of said motor, indicated at 10, is shown as supported at its outer end in a bracket 11 which may be bolted to the standard 3, as indicated at 12. The shaft is provided with a longitudinal keyway 13 by means of which a friction wheel 14 may be adjustably secured thereto. For the purpose of adjusting the said wheel along said shaft, to vary the speed of rotation of its cooperating friction disk, the wheel is provided with a grooved hub 15 adapted to receive the forks of a yoke 16 which is provided with a hub 17 slidably mounted upon a rod 18, parallel with the shaft 10 and conveniently supported at one end in a bracket 11 and at its opposite end in a post 19 carried by the table 8. A set screw 20 enables the wheel 14 to be secured in any position to which it may be adjusted upon the shaft 10.

21 denotes the friction disk, mounted upon a shaft 22 journaled in bearings 23 and 24 carried by upright frames or brackets 25 and 26, respectively, secured to the table 8. Slidably mounted upon the shaft 22 are the gears 27 and 28, said gears being mounted upon a common hub or sleeve 29 which may be connected to the shaft 22 by a set screw 30. By suitable adjustment of the hub 29, the gear 27 may be brought into mesh with a gear 31 and the gear 28 into mesh with a gear 32, the gears 31 and 32 being connected to a counter-shaft 33 journaled in brackets 34 and 35 carried by the standard 3. The counter-shaft 33 is provided with a worm 36 meshing with a worm wheel 37 on a shaft 38 journaled in a bracket 39 which is detachably connected to the standard 3, as by means of a screw bolt 40. The shaft 38 is provided with a worm 41 meshing with a worm wheel 42 carried by a shaft 43 which is journaled in the forks 44 provided at the upper end of the bracket 3 and on each side of the recess 5 therein. Secured to this shaft is a sleeve 45 having a sprocket 46 thereon.

Journaled in the forks 47 of the bracket 4 is a shaft 48 having a sprocket 49. This shaft is provided with a worm wheel 50 which is adapted to mesh with a worm 51 carried by a shaft 52 which is mounted in a bracket 53 pivoted to the standard 4, as by means of a screw bolt 54 and having an aperture 55 therethrough which is adapted to register with an aperture 56 in said standard, whereby a pin may be inserted in said apertures to retain the worm and the worm wheel in driving engagement. By removing the pin, the bracket 53 and the worm shaft will drop to the inoperative position shown in Fig. 4. The shaft 52 is provided with an operating wheel 57 having a handle 58.

59 denotes a carriage which in cross section is preferably an inverted channel. Mounted in the flanges of the carriage are the rods or shafts 60 each carrying a pair of grooved wheels 61 adapted to ride upon the rails 2. Extending transversely of the top of the carriage is a slideway 63. Mounted upon this slideway is a slide 64, the slide and the slideway being dovetailed, as indicated at 65. Secured to the slide 64, as by means of a screw 66, is a post 67 having in the upper end thereof a socket 68. The slide 64 is provided at each end with a downwardly extending flange 69. Loosely mounted in these flanges is a screw shaft 70 which extends through and is in threaded engagement with a projection 71 on top of the carriage 59. The shaft 70 is provided with collars 72 secured thereto and adapted to thrust against the flanges 69, according to the direction of the rotation of said shaft. A hand wheel 73 is provided for rotating the shaft.

Mounted in the socket 68 is a stud 74, said stud carrying a split sleeve 75 the lugs 76 whereof are connected by a screw 77 having a hand wheel 78 and adapted to clamp the said sleeve about a horizontally extending post 79 provided with a forked extension 80. Between the forks of this extension there is provided a segmental thread 81 adapted to receive a worm 82 on a shaft 83 provided with an operating wheel 84. Pivoted between the forks, by means of a pin or shaft 85, is one end of a block 86. This end of the block is provided with a worm gear segment 87 adapted to mesh with the worm 82. The opposite end of the block 86 is provided with a split sleeve 88 having projections 89 adapted to be connected by means of a clamp screw 90. Through the projections 89 extends a shaft 91 provided with a gear 92 between said projections, the shaft being provided with an operating wheel 93. The block 86 supports in its sleeve 88 a torch indicated generally at 94. The torch is provided with a cylindrical outer surface 95 extending between upper and lower abutments 94ᵃ and is rotatably mounted within the sleeve 96, which surrounds the surface 95, between said abutments, and which is provided with a rack 97 adapted to mesh with the gear 92, whereby the torch may be adjusted longitudinally with respect to the sleeve 88. The torch is preferably of the type shown in my Patent No. 1,277,069, in which the passages for the preheating mixture are angularly spaced and grouped about a central passageway for the cutting oxygen. The rotary adjustment of the torch within the sleeve 96 enables a jet of the preheating gas to be delivered in front of and behind the jet for cutting oxygen and in the line of travel of the same, thus enabling the preheating jets to operate with maximum efficiency upon the metal to be cut.

The torch is provided with a valve block 98 containing passages for combustible gas and oxygen and is of the same general construction as the block shown in my Patent No. 1,277,069. However, instead of operating the valve for cutting oxygen by means of a lever adapted to be grasped by the hand of the operator, the stem 99 of said valve is operated by a lever 100, pivoted to the block at 101 and having an internally threaded sleeve 102. Mounted in this sleeve is a screw 103 provided with a hand wheel 104 and adapted to bear against the block. By rotating the screw, the valve for cutting oxygen may be very accurately positioned and the supply of cutting oxygen correspondingly controlled.

For the purpose of driving the torch carriage 59, the latter is provided with a post 105, said post having an aperture 106 through the upper end thereof within which there is mounted a pin 107 having a flanged roller or spool 108 thereon. Through the opening 106 and above the roller 108 there extends a chain 109 which is mounted on the sprockets 46 and 49. Threaded in the web or cross head 110 at the top of the post is a screw 111 having an operating wheel 112 and provided at its lower end with a presser plate 113 which is adapted to force the chain into engagement with the spool or roller 108, thus providing a driving connection between said chain and the carriage 59.

In order to insure the retention of the carriage 59 upon its track 2 and thus maintain an unbroken cutting or welding line, a post 114 is slidably mounted in the top of the frame 59 and in a bracket 115 secured to the other side of said plate and projecting therebeneath. A spring 116 surrounds the lower end of said post, pressing at one end against the bracket 115 and at its opposite end against a shoulder 117 on said post. The upper end of the post is forked and rotatably supports a grooved roller 118 which is yieldingly thrust by the spring 116 against a rod 119 which is secured to the standards 3 and 4.

With the parts constructed and arranged as described, the operation will be as follows: When it is desired to drive the torch carriage by power, the rotation of the motor shaft will be transmitted to the friction wheel 14, friction disk 21, and by either of the sets of gears 27 and 31 or 28 and 32, to the shaft 33; then from the shaft 33 through worm 36 and worm gear 37 to shaft 38 and, from the latter shaft, by the worm 41 and worm wheel 42, to the shaft 43, driving the sprockets 46 and 49 and the chain 109, the chain being connected to the carriage 59 by the post 105 and the chain clamp comprising the parts 107—113. The speed imparted to the chain 109 may be varied, not only by varying the driving engagement between the friction wheel 14 and the friction disk 21, but by employing either of the sets of gears 27 and 31 or 28 and 32. In practice, the speed at which the torch will be moved can be varied from ¾ inch per minute to 30 inches per minute.

It will be unnecessary to reverse the motor at the end of a cutting or welding movement since, by merely slacking up on the screw 111, the driving connection between the chain and the carriage may be broken and the carriage reversed by hand, after which it may be reconnected to the chain. Any tendency of the carriage wheels to leave their tracks will be corrected by means of the yielding pressure exerted upon the carriage by the post 114, roller 118, and rod 119.

Should it be desirable to operate the torch by hand, this result may be quickly and conveniently accomplished by disconnecting the bracket 39 from the standard 3, thereby disengaging the worms 36 and 41 from their respective worm wheels 37 and 42. Then, by rotating the shaft 52 about its pivot 54, the worm 51 on said shaft will be brought into mesh with the worm gear 50 on the sprocket shaft 48, securing the worm shaft when in this position by inserting a pin into the apertures 55 and 56.

The torch may be adjusted transversely of the carriage 59 by rotating the hand wheel 73. The stud 74 provides a vertical pivot about which the torch may be swung as well as means for adjusting the torch vertically without varying its angle of inclination to the work. The stud 79 and its mounting provide means for rotating the torch about a horizontal axis in a vertical plane. The worm 82, shaft 83, and worm gear segment 87 provide means whereby the torch may be adjusted in a vertical plane, at right angles to the former vertical plane, about the axis 85; while the manner of mounting the torch in the sleeve 96 enables me to rotate the torch about its own axis thereby to locate a preheating jet in advance of as well as behind the cutting oxygen jet and in the line of travel of the latter.

Having thus described my invention, what I claim is:—

1. In a machine of the character described, the combination of a base, a carriage supported by and movable along said base, a blow-pipe or torch mounted on said carriage, an operating device movable in the direction of travel of said carriage on said base and independent of said carriage, and means for connecting the said carriage with the said device.

2. In a machine of the character described, the combination of a base, a carriage supported by and movable along said base, a blow-pipe or torch mounted on said carriage, an operating device movable in the direction of travel of said carriage on said base and independent of said carriage, and means for detachably connecting the said carriage with said device.

3. In a machine of the character described, the combination of a base, a carriage supported by and movable along said base, a blow-pipe or torch mounted on said carriage, an endless operating device extending in the direction of travel of said carriage along said base, and means for detachably connecting the said carriage with said device.

4. In a machine of the character described, the combination of a carriage, a blowpipe or torch supported thereby, an endless operating device extending in the direction of travel of said carriage, a post projecting from said carriage, and a detachable connection between the said carriage and the said post.

5. In a machine of the character described, the combination of a carriage, a blowpipe or torch supported by said carriage, sprockets, a chain extending around said sprockets, means connecting the said carriage and the said chain, and means for driving the said sprockets.

6. In a machine of the character described, the combination of a supporting base, a carriage movable along said base, a blow-pipe or torch supported by said carriage, sprockets supported upon said base, a chain extending around said sprockets, a detachable connection between the said carriage and the said chain, and means for driving the said sprockets.

7. In a machine of the character described, the combination of a carriage, a track, rollers for supporting the said carriage on said track, a blowpipe or torch supported by said carriage, means for moving the said carriage along said track, and means yieldingly pressing the said carriage toward said track.

8. In a machine of the character described, the combination of a carriage, a support therefor, rollers for said carriage, a blowpipe or torch supported by said carriage, means for moving the said carriage, and means pressing the said carriage towards said support.

9. In a machine of the character described, the combination of a carriage, a track, rollers supporting the said carriage on said track, a blowpipe or torch supported by said carriage, means for moving the said carriage along said track, a rod extending above said carriage in the direction of travel thereof, a post yieldingly supported by said carriage, and a roller carried by said post and engaging said rod.

10. In a machine of the character described, the combination of a carriage, rollers for said carriage, a blowpipe or torch supported by said carriage, means for moving the said carriage, a rod extending above said carriage in the direction of travel thereof, and a thrust device on said carriage and cooperating with said rod to press the carriage toward the support for the said rollers.

11. In a machine of the character described, the combination of a carriage, a blowpipe or torch supported thereby, and means for driving said carriage, said means comprising a friction disk, a friction wheel movable across the face of said disk, a shaft carried by one of the aforesaid friction members, a pair of gears slidably mounted on said shaft, a counter shaft having a pair of gears thereon adapted to be engaged by the first mentioned gears, respectively, a carriage moving device, and operative driving connections between the second shaft and the said device.

12. In a machine of the character described, the combination of a carriage, a blowpipe or torch supported thereby, and means for driving said carriage, said means comprising a drive shaft, a second shaft and means for driving the same variably from the drive shaft, a third shaft, a pair of gears slidably mounted on the third shaft, a counter-shaft having a pair of gears thereon adapted to be engaged by the first mentioned gears, respectively, a carriage moving device, and operative driving connections between the third shaft and the said device.

13. In a machine of the character described, the combination of a carriage, a blowpipe or torch supported thereby, and means for driving said carriage, said means comprising a friction disk, a friction wheel movable across the face of said disk, a shaft carried by one of the aforesaid friction members, a pair of gears slidably mounted on said shaft, a counter shaft having a pair of gears thereon adapted to be engaged by the first mentioned gears, respectively, a carriage moving device, a worm on the second shaft, a shaft having a worm wheel meshing with said worm and itself provided with a worm, a shaft having a worm wheel meshing with the second worm, an endless operating device driven by the last mentioned shaft, and means connecting said device to said carriage.

14. In a machine of the character described, the combination of a carriage, a blowpipe or torch supported thereby, and interchangeable power and hand actuated means for driving said carriage.

15. In a machine of the character described, the combination of a carriage, a blowpipe or torch supported thereby, a power shaft, means including a breakable connection for driving said carriage from said shaft, and means including a second breakable connection for driving the said carriage independently of said shaft.

16. In a machine of the character described, the combination of a carriage, a blowpipe or torch supported thereby, an operating device movable in the direction of travel of said carriage, means for connecting the carriage to said device, and interchangeable power actuated and manually operated means for driving the said device.

17. In a machine of the character described, the combination of a carriage, a blowpipe or torch supported thereby, an operating device movable in the direction of travel of said carriage, means for connecting the carriage to said device, a power driven shaft, a breakable connection between said shaft and the said device, and means including a second breakable connection for driving said device independently of the power driven shaft.

18. In a machine of the character described, the combination of a carriage, a blowpipe or torch supported thereby, an operating device movable in the direction of travel of said carriage, means for connecting the carriage to said device, a power driven shaft, means for transmitting power from the said shaft to the said device, said means including a movably supported counter shaft having gears thereon, and a manually operated power device for operating the first mentioned device, and a breakable connection between the said devices.

19. In a machine of the character described, the combination of a carriage, a blowpipe or torch supported thereby, an operating device connected to said carriage, a power driven shaft, means including a breakable connection for operating said device from said shaft, a manually operated power device for operating the first mentioned device, and a breakable connection between the said devices.

20. In a machine of the character described, the combination of a carriage, a blowpipe or torch supported thereby, an operating device connected to said carriage, a power driven shaft, means including a breakable connection for operating said device from said shaft, a pivoted shaft having a gear thereon, and a shaft connected with the said device and having a gear thereon adapted to be engaged by said worm.

21. In a machine of the character described, the combination, with a carriage, and means for moving the same, of a blowpipe support mounted on said carriage and means for moving the same with respect to said carriage, and a blowpipe or torch mounted on said support.

22. In a machine of the character described, the combination, with a carriage and means for moving the same, of a slide mounted on said carriage and means for moving the same with respect to said carriage, a blowpipe or torch, and an adjustable connection between the latter and said slide.

23. In a machine of the character described, the combination, with a carriage and means for moving the same, of a support mounted on said carriage and means for moving the same with respect to said carriage, a supporting member rotatably mounted on said support, and a blowpipe support adjustably connected to said member.

24. In a machine of the character described, the combination, with a carriage and means for moving the same, of a support mounted on said carriage and means for moving the same with respect to said carriage, a supporting member rotatably mounted on said support and adjustable toward and from the same, and a blowpipe support rotatably connected to said member.

25. In a machine of the character described, the combination, with a carriage and means for moving the same, of a forked member supported by said carriage, a blowpipe support having a geared projection and pivotally supported between the forks of said member, and a gear mounted between the forks of said member and engaging the said geared projection.

26. In a machine of the character described, the combination, with a carriage and means for moving the same, of a forked member supported by said carriage, a blowpipe support having a worm gear segment pivotally supported between the forks of said member, and a worm mounted between the forks of said member and engaging the worm wheel segment.

27. In a machine of the character described, the combination, with a carriage and means for moving the same, of a supporting member pivotally supported from the carriage, a second member pivotally supported by the first mentioned member, a third member pivotally supported by the second member, a blowpipe rotatably supported by the third member, and means cooperating with the third member for moving the blowpipe in the direction of its length.

28. In a machine of the character described, the combination, with a carriage and means for moving the same, of a blowpipe supporting member carried by said carriage and having a sleeve, a sleeve mounted within the first mentioned sleeve, a blowpipe having a bearing cooperating with the top of the second sleeve and rotatably mounted in the said sleeve, and means supported by the first sleeve and cooperating with the second sleeve for moving the blowpipe longitudinally with respect to the first sleeve.

29. In a machine of the character described, the combination, with a carriage and means for moving the same, of a blowpipe supporting member carried by said carriage and having a sleeve, a sleeve mounted within the first mentioned sleeve, and a blowpipe rotatably mounted in the second sleeve.

30. In a machine of the character described, the combination, with a carriage and means for moving the same, of a sleeve supported by said carriage, and a blowpipe or torch rotatably mounted in said sleeve.

31. In a machine of the character described, the combination, with a carriage and means for moving the same, of a blowpipe or torch supported by said carriage, the said blowpipe or torch having a valve stem for cutting oxygen, a lever pivoted to said blowpipe or torch and adapted to engage said stem, said lever having a sleeve, and a screw threaded through said sleeve and adapted to engage a portion of the blowpipe or torch thereby to rock the said lever about its pivot and to operate the said valve stem.

32. In a machine of the character described, the combination, with a carriage, of a support movable with respect thereto, a member movably mounted on said support, a second member movably supported by the first member, a third member movably supported by the second member, a blowpipe or torch movably supported by the third member, and means for moving said carriage.

33. In a machine of the character described, the combination, with a carriage, of a support movable transversely thereof, a member rotatably mounted on said support, a second member rotatably mounted on the first member, a third member pivotally connected to the second member, a blowpipe or torch adjustably mounted in the third member, and means for moving said carriage.

34. In a machine of the character described, the combination, with a carriage, of a slide movable transversely thereof, a member mounted on said slide to rotate about a vertical axis, a second member mounted on the first member to rotate about a horizontal axis, a third member pivoted to the second member and adapted to be moved in a vertical plane, a blowpipe or torch carried by the third member and longitudinally and rotatably adjustable with respect thereto, and means for moving said carriage.

In testimony whereof, I hereunto affix my signature.

JOHN HARRIS.